US008533361B1

(12) United States Patent
Roskind

(10) Patent No.: US 8,533,361 B1
(45) Date of Patent: Sep. 10, 2013

(54) CONTENT SELECTABLE TRUSTED DNS RESOLVERS

(75) Inventor: James Roskind, Redwood City, CA (US)

(73) Assignee: Google Inc., Mountain View, CA (US)

(*) Notice: Subject to any disclaimer, the term of this patent is extended or adjusted under 35 U.S.C. 154(b) by 331 days.

(21) Appl. No.: 12/883,376

(22) Filed: Sep. 16, 2010

(51) Int. Cl.
G06F 15/16 (2006.01)
(52) U.S. Cl.
USPC .......................................... 709/245
(58) Field of Classification Search
USPC .......................................... 709/245
See application file for complete search history.

(56) References Cited

U.S. PATENT DOCUMENTS

| | | | | |
|---|---|---|---|---|
| 7,069,325 | B1 * | 6/2006 | Lu et al. ........................ | 709/226 |
| 7,844,735 | B2 * | 11/2010 | Andreev et al. ............... | 709/245 |
| 7,984,186 | B2 * | 7/2011 | Perry et al. .................... | 709/245 |
| 2004/0015584 | A1 * | 1/2004 | Cartmell et al. .............. | 709/225 |
| 2006/0075139 | A1 * | 4/2006 | Jungck ........................... | 709/245 |
| 2006/0253609 | A1 * | 11/2006 | Andreev et al. ............... | 709/245 |
| 2007/0100958 | A1 * | 5/2007 | Hegde et al. .................. | 709/217 |
| 2008/0086574 | A1 * | 4/2008 | Raciborski et al. ........... | 709/245 |
| 2010/0034381 | A1 * | 2/2010 | Trace et al. .................... | 380/255 |
| 2012/0023153 | A1 * | 1/2012 | Karasaridis .................... | 709/203 |

OTHER PUBLICATIONS

David Pogue, "Simplifying The Lives of Web Users," The New York Times, http://www.nytimes.com/2010/08/19/technology/personaltech/19pogue.html?_r=1&pagew, dated Aug. 18, 2010, 4 pages.
Co-pending, U.S. Appl. No. 12/883,393 inventor Roskind, J., filed Sep. 16, 2010 (Not Published).
John R. Joyce, Ph.D., "gDNS: Taking a Chance on Improving Internet Performance—Google's public domain server," Scientific Computing, http://www.scientificcomputing.com/articles-TT-gDNS-Taking-a-chance-on-improving-internet—performance-122209.aspx, dated Dec. 22, 2009, 2 pages.

* cited by examiner

Primary Examiner — Mark Rinehart
Assistant Examiner — Kenneth P Hunt
(74) Attorney, Agent, or Firm — Sterne, Kessler, Goldstein & Fox P.L.L.C.

(57) ABSTRACT

Methods and systems for DNS resolution are provided. A method for DNS resolution may include identifying a domain name to be resolved. The method may further include providing resolver information associated with the identified domain name. The resolver information indicates that a global DNS resolver is available to resolve the identified domain name. A further embodiment may include requesting DNS resolution of the identified domain name with the global DNS resolver without using a local DNS resolver. A system for DNS resolution may include a domain identification module, a resolver information module and a resolution requester.

21 Claims, 4 Drawing Sheets

Conventional DNS Resolution

CONTENT SELECTABLE TRUSTED DNS RESOLVERS

BACKGROUND

1. Technical Field

Embodiments relate to applications and the World Wide Web.

2. Background Art

Web browsers may use a number of protocols and standards to obtain or manage content flow. Most browsers primarily use hypertext transfer protocol (HTTP) to fetch content and web pages. Web pages are located using a uniform resource locator (URL), which identifies where the web page may be found. Web pages may be retrieved using the Internet Protocol (IP) address of the computer holding the web page content. In order to be more memorable and human friendly, an IP address or hierarchy may be represented by a hostname (such as www.google.com). A hostname is a domain name that has one or more associated IP addresses. Hostnames and other information associated with domain names may be resolved or translated to IP addresses using the Domain Name System (DNS). This DNS resolution system is sometimes referred to as the "phone book" for the Internet.

DNS resolution requires either looking in a local computer cache for a DNS resolution or querying a set of DNS servers over the network. DNS utilizes authoritative DNS resolvers to help map domain names to IP addresses. Multiple DNS resolvers may be used in order to avoid having all the information in a single, central DNS server. Local and global DNS servers may provide DNS resolutions.

DNS resolution normally looks to a local DNS resolver, typically on an intranet, to provide a DNS resolution before obtaining a DNS resolution from an external DNS resolver, such as a global DNS resolver, that provides DNS resolutions on a more global basis. For example, FIG. 1 illustrates an exemplary system 100 that performs DNS resolution. When network traffic is required, a network request for a resolution is created. If not satisfied locally, the request is sent, most commonly via User Datagram Protocol (UDP) packets and occasionally via TCP/IP packets (or similar) to a DNS resolver, and eventually a response is provided. If a DNS resolution is not selected from a local cache, such as DNS cache 110, DNS resolution is requested from local DNS resolver 130 located within the same Local Area Network (LAN) 120. Next, a DNS resolution may be requested, if necessary, from an external DNS resolver such as global DNS resolver 150 or main DNS server 170 over external network 140. There is a latency time required to request DNS resolution from local DNS resolver 130 and then from DNS global resolver 150.

DNS resolvers are often slow, and/or underprovisioned by internet service providers, resulting in high latency when resolving domain names. Longer latency times cause discomfort to users of a web browser. Some vendors, such as GOOGLE and its global DNS resolver, gDNS, have provided high-speed DNS resolution service, but such services go largely unused because of the difficulty of integrating a second (or alternate) global resolution service, while still providing local (LAN) resolutions and maintaining correctness.

BRIEF SUMMARY

The embodiments described below include systems and methods for domain name system (DNS) resolution. According to an embodiment, a method for DNS resolution may include identifying a domain name to be resolved. The method may further include providing resolver information associated with the identified domain name. The resolver information indicates that a global DNS resolver may be used to resolve the identified domain name. Global DNS resolution is to be the primary means for resolving the domain name. A further embodiment may include requesting DNS resolution of the identified domain name with the global DNS resolver without using a local DNS resolver.

According to another embodiment, a system for DNS resolution may include a domain identification module configured to identify a domain name to be resolved. The system may also include a resolver information module configured to provide resolver information associated with the identified domain name. The resolver information indicates that a global DNS resolver may be used to resolve the identified domain name.

According to an embodiment, a method for domain name system (DNS) resolution may include identifying a domain name to be resolved. The method may also include determining from DNS resolution records that the identified domain name may use a global DNS resolver to resolve the identified domain name without using a local DNS resolver.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

DNS resolution may be slow and result in latency when resolving domain names. High-speed DNS resolution service is available, but such services go largely unused because of the difficulty of integrating a second global resolution service, while still providing local (LAN) resolutions. The embodiments described below relate to providing DNS resolution using resolver information. Such embodiments may provide a mechanism for integrating support for global resolvers, reducing user latency, and maintaining correctness. For example, a global DNS resolver, provided by a third party, may be used without having to wait for a local DNS resolution in a LAN, or a slower global DNS resolution.

Figure 1:
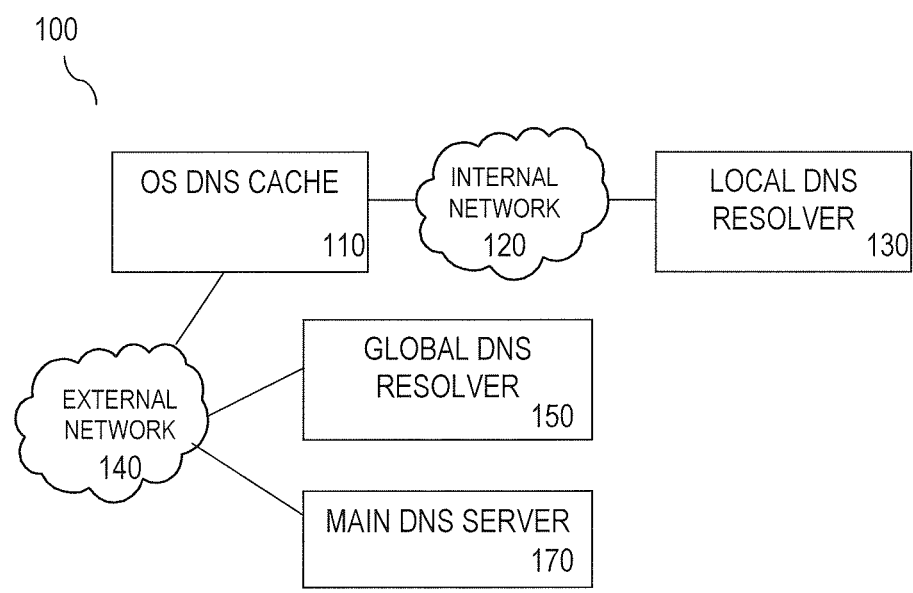
FIG. 1 is a diagram showing an existing system for DNS resolution.
Figure 2:
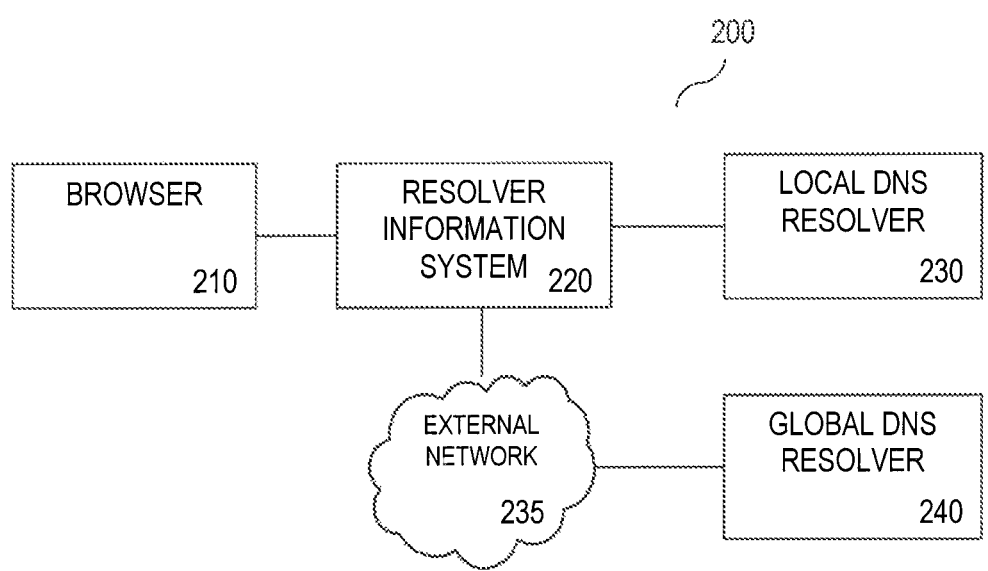
FIG. 2 is a diagram of a system for DNS resolution, according to an embodiment.

FIG. 2 shows exemplary system 200 for DNS resolution, according to an embodiment. System 200 shows browser 210 and resolution information system 220, which may be coupled to local DNS resolver 230 and/or global DNS resolver 240 over one or more networks 235. Browser 210 and resolution information system 220 may be coupled directly or indirectly. According to an embodiment, browser 210 may include any device, application or module that enables a user or computer to navigate and/or retrieve data from another data source, typically over a network. Browser 210 may include any conventional web browser such as those that are widely available. Browser 210 may also be a multi-process browser such as CHROME available from Google Inc. According to a further embodiment, browser 210 may also be configured to use any number of protocols, including protocols such as HTTP, FTP, and underlying protocols such as TCP/IP or UDP. Network(s) 235 may be any type of data network or combination of data networks including, but not limited to, a local area network (LAN), a medium area network, or a wide area network such as the Internet. Browser 210 may also be configured to support or interact with any number of world wide web protocols, applications or services.

Browser 210 and/or resolver information system 220 may exist within or be executed by hardware in a computing device. For example, browser 210 and/or resolver information system 220 may be software, firmware, or hardware or any combination thereof in a computing device. A computing device can be any type of computing device having one or more processors. For example, a computing device can be a workstation, mobile device (e.g., a mobile phone, personal digital assistant, or laptop), computer, game console, set-top box, kiosk, embedded system or other device having at least one processor and memory. A computing device may include a communication port or I/O device for communicating over wired or wireless communication link(s). Browser 210 and resolution information system 220 may be located on the same or different computing devices.

According to an embodiment, browser 210 may be configured to request DNS resolution for a URL hostname or domain. Resolver information system 220 may be configured to provide resolver information associated with a domain name. The resolver information may indicate that a global DNS resolver may be used to resolve an identified domain name. Resolver information may also include the availability of a global DNS resolver. Resolver information may also include information about a global DNS resolver. Resolver information system 220 may obtain resolver information from web content, such as a link or HTTP header. Resolver information may also be embedded in other content or provided by scripting languages or other data sources. Resolver information system 220 may also receive and retain resolver information.

There have been problems with using a global resolver to avoid "leaking" names that are being resolved. Resolver information system 220 may be used to establish a "trusted" resolver. That is, a global resolver trusted by the user, and transitively trusted by the content provider. This trust chain ensures that a leak is not a problem, or that there is no chance that a local name will be leaked to a global resolver. It will also help ensure that a bogus or malicious resolution will not misdirect an application.

An application provider, such as GOOGLE providing a CHROME browser, may embed one or more trusted resolvers, such as gDNS or a reference to gDNS, in an application distribution, according to an embodiment. For example, content providers, such as GOOGLE search, may provide additional metadata indicating that links on the page can and should be resolved by a global resolver. With such metadata, an application may rely on a global resolver, and not wait for a local resolution. It may be indicated that global DNS resolution is the primary means for resolution of a domain name. This should result in significantly faster page load latency by reducing expected DNS resolution latency. In some cases, DNS resolution may be requested from both local and global DNS resolvers, and the first available resolution may be selected.

In some embodiments, network applications, such as a browser, may be bundled with or include a trusted global resolution system. For example, global resolution system 220 may include code that automatically uses a global DNS resolver, such as gDNS, or OpenDNS. In some cases, the building or integration of the global resolver will be trusted implicitly by a user, by virtue of trusting the application. In other cases, trust for a global resolver may be provided explicitly, such as by having a user explicitly select or endorse the use of the trusted resolver. In some embodiments, a user interface dialog box may be used to select or endorse one or more trusted resolvers.

In some embodiments, an application may rely on DNS resolutions by one or more trusted global resolvers. For example, some applications may rely on the first resolution provided, from among several resolvers, including local and global resolvers. In other embodiments, an application may only rely on a global resolver if resolution information, such as metadata, exists that indicates that a local resolution is not needed. For example, content may be annotated to indicate that a domain is a globally routable domain. Accordingly, a global resolver may be used. Content may be annotated to refer to a domain, such as by containing a link to a path in a domain. In some cases, a specific global resolver, such as gDNS from GOOGLE, may be relied upon if content specifies that such a specific resolver is an acceptable global resolver. For example, if both gDNS and OpenDNS resolvers are trusted and available in a browser, but a web page indicates that only gDNS may be used as an alternative, then a web browser may exclude OpenDNS from its resolution operation, attempt a resolution via both gDNS and a default local resolver, and use the first available resolution.

In some embodiments, content providers may include annotation with content to indicate that one or more global resolvers may be used to resolve one or more or all domains within given content. For example, GOOGLE Web Search may indicate that all domains on a given page can be resolved by a global resolver, if one is available. In some embodiments, annotations may include metadata, such as HTTP headers. For example, a header such as X-GLOBALLYROUTABLEDOMAINS=ALL may be added to HTTP content to indicate that all links and domains may be resolved via a global resolver.

In another example, a header may indicate X-GLOBALLYROUTABLEDOMAINS=imgs.google.com, metrics.google.com, to indicate an explicit subset of domains that may be resolved globally. As another example, a header of the form X-GLOBALRESOLVERS=gDNS may be added to indicate that only gDNS is acceptable for performing additional global resolutions.

According to an embodiment, content may be annotated in place. For example, a standard link <a href=foo.com> may be augmented to <a href=foo.com type=global> to indicate that the domain in the link can acceptably be resolved using a global resolver. Other combinations of metadata and/or embedded data may be used to assert that correctness will be preserved if global resolution information is used.

In some embodiments, all content from a given web site may be explicitly or implicitly annotated to indicate that the content can rely on a global resolver, according to an embodiment. For example, metadata indicating such reliance may be provided in one or more connections, such as by adding a header X-GLOBALLYROUTABLEDOMAINS=UNIVERSAL. In another example, DNS records for a given domain, such as resolution records for www.google.com, may include fields that indicate that the site provides content that contains domains that are always globally resolvable. In other examples, it may be indicated that local DNS resolution is not needed.

Figure 3:
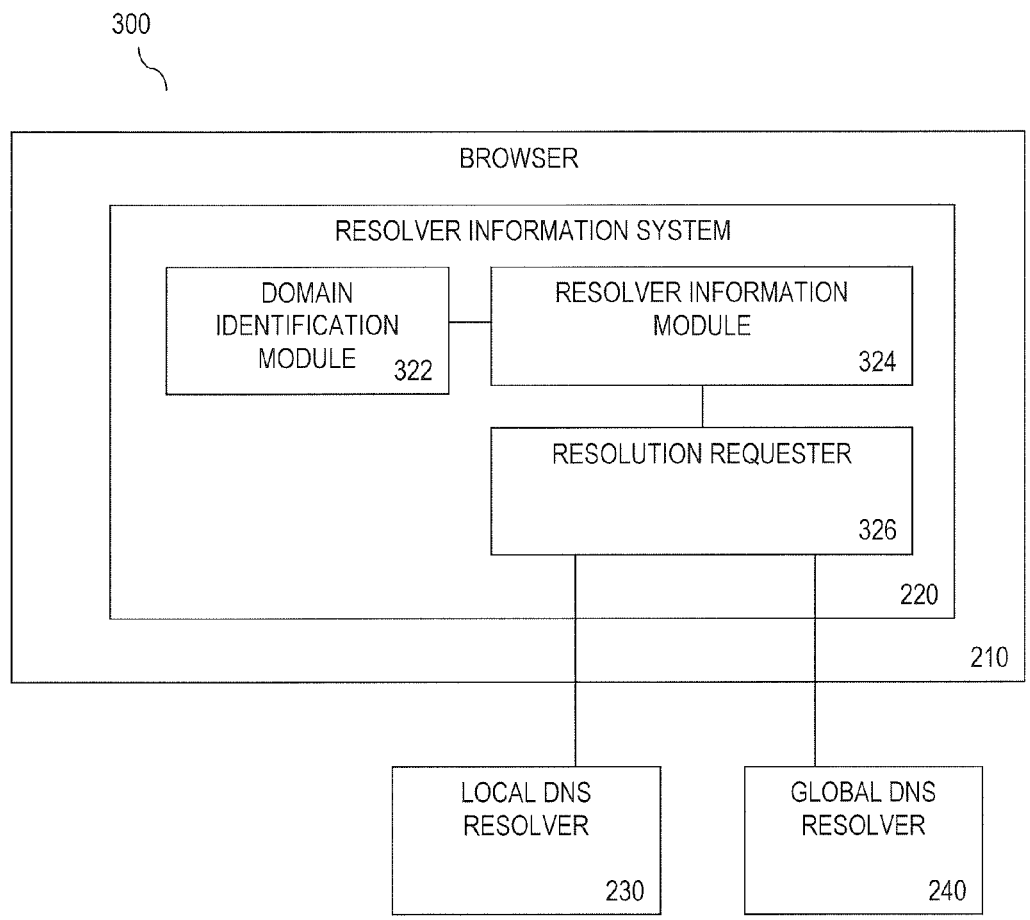
FIG. 3 is a more detailed diagram of a system for DNS resolution, according to an embodiment.

FIG. 3 illustrates another exemplary system 300 for DNS resolution, according to an embodiment. System 300 includes browser 210, resolver information system 220, local DNS resolver 230 and global DNS resolver 240. Resolver information system 220 may include a domain identification module 322, resolver information module 324 and resolution requester 326. These components may be coupled together directly or indirectly.

According to an embodiment, domain identification module 322 may be configured to identify a domain name to be resolved. In some cases, domain names to be resolved may be determined from a web page or search results. In other cases, domain names to be resolved may be received.

Resolver information module 324 may be configured to obtain and use resolver information, as described in embodiments above. Resolver information module 324 may also be configured to determine whether a suggested global DNS resolver is trusted. Resolver information module 324 may be configured to receive a selection of a global DNS resolver. Such a selection may be made by a user. For instance, a user may choose or predetermine a global DNS resolver among other DNS resolvers. Resolver information module 324 may be configured to annotate a uniform resource locator (URL) or an HTTP header with resolver information. In some cases, resolver information module 324 may be configured to use DNS resolution records to determined that a domain may be resolved using a global DNS resolver.

Resolution requester 326 may be configured to request DNS resolution from a DNS resolver, such as local DNS resolver 230 or global DNS resolver 240, according to an embodiment. Resolution requester 326 may use resolution information to determine what DNS resolver to request DNS resolution from. For example, resolution requester 326 may be configured to request DNS resolution of an identified domain name with a global DNS resolver 240 without using a local DNS resolver. Resolution requester 326 may also be configured to request DNS resolution of an identified domain name with global DNS resolver 240 prior to using a local DNS resolver 230. In some cases, resolution requester 326 may be configured to automatically request DNS resolution of an identified domain name with global DNS resolver 240 based on resolver information.

Figure 4:
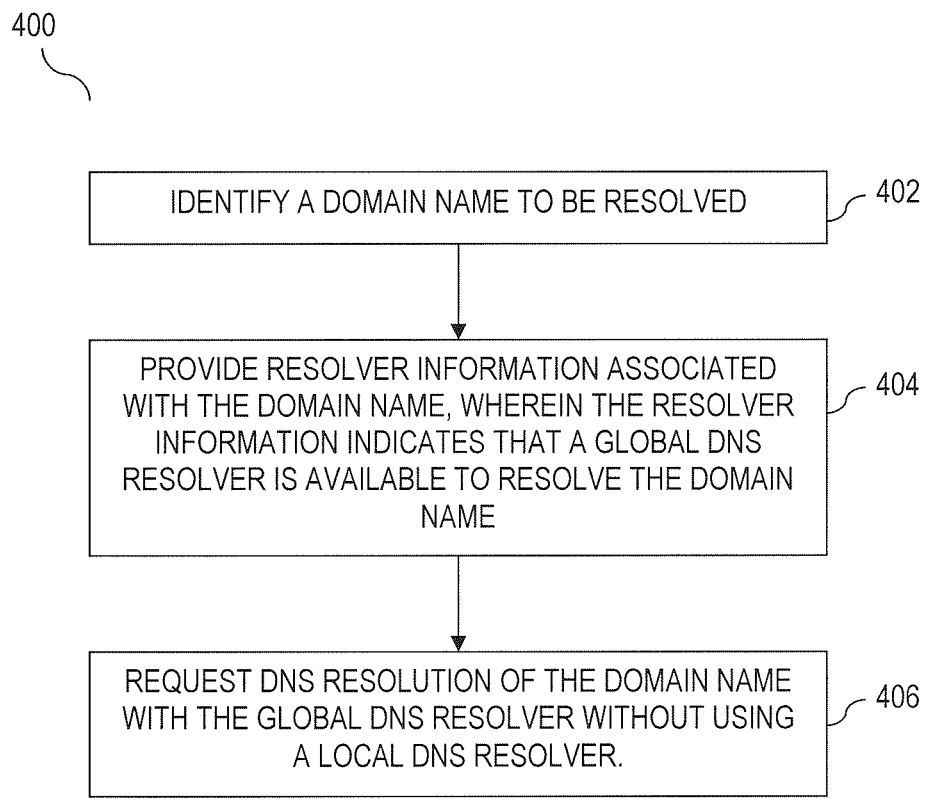
FIG. 4 is a flowchart illustrating a method for DNS resolution, according to an embodiment.

FIG. 4 illustrates an exemplary method 400 for DNS resolution, according to an embodiment. In step 402, a domain name to be resolved may be identified. In some cases, a domain name is selected by a user. In other cases, a domain name may be fetched or cached before a user selects a URL link associated with the domain name. In step 404, resolver information associated with an identified domain name may be provided so that DNS resolution may be requested. This resolver information may be retrieved from web page content, as described above. In one example, the resolver information may indicate that a global DNS resolver may be used to resolve the identified domain name.

In step 406, resolution results for a domain name may be requested from a global DNS resolver. In some cases, resolution results may be received from a global DNS resolver without requesting DNS resolution from a local DNS resolver. A trusted global DNS resolver may be used. According to an embodiment, steps 402-406 may be performed by browser 210. According to another embodiment, steps 402, 404 and 406 may be performed by domain identification module 322, resolution information module 324 and resolution requester 326, respectively.

Aspects of the embodiments for exemplary system 200, system 300, and/or method 400 or any part(s) or function(s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computing device-implemented method for domain name system (DNS) resolution comprising:
   identifying a domain name to be resolved; and
   providing, with a first computing device, resolver information associated with the domain name to a second computing device, wherein the resolver information indicates that a global DNS resolver is to be used by the second computing device to resolve the identified domain name, without checking, by the first computing device, whether the domain name is resolvable by a local DNS resolver.

2. The method of claim 1, further comprising requesting, by the second computing device, DNS resolution of the identified domain name with the global DNS resolver without using the local DNS resolver.

3. The method of claim 1, further comprising requesting, by the second computing device, DNS resolution of the identified domain name with the global DNS resolver prior to using the local DNS resolver.

4. The method of claim 1, farther comprising automatically requesting, by the second computing device, DNS resolution of the identified domain name with the global DNS resolver based on the resolver information.

5. The method of claim 1, further comprising determining, by the second computing device, whether the global DNS resolver is trusted.

6. The method of claim 1, further comprising receiving, by the second computing device, a selection of a global DNS resolver.

7. The method of claim 1, further comprising:
requesting, by the second computing device, DNS resolution of the identified domain name with two or more DNS resolvers; and
selecting a resolution that is provided first.

8. The method of claim 1, further comprising requesting, by the second computing device, DNS resolution of the identified domain name based on header information.

9. The method of claim 1, further comprising annotating, by the first computing device, a uniform resource locator (URL) with the resolver information.

10. A computing device-implemented method for domain name system (DNS) resolution comprising:
identifying a domain name to be resolved:
annotating, by a first computing device, an HTTP header with resolver information associated with the domain name; and
providing, by the first computing device, the annotated HTTP header to a second computing device, wherein the resolver information indicates that a global DNS resolver is to be used by the second computing device to resolve the identified domain name.

11. A system for domain name system (DNS) resolution comprising:
a domain identification module configured to identify a domain name to be resolved; and
a resolver information module, implemented on a first computing device, configured to receive resolver information associated with the identified domain name from a second computing device, wherein the resolver information indicates that a global DNS resolver is to be used by the first computing device to resolve the identified domain name without checking, the first computing device, whether the domain name is resolvable by a local DNS resolver.

12. The system of claim 11, further comprising a resolution requester configured to request DNS resolution of the identified domain name with the global DNS resolver without using the local DNS resolver.

13. The system of claim 11, further comprising a resolution requester configured to request DNS resolution of the identified domain name with the global DNS resolver prior to using the local DNS resolver.

14. The system of claim 11, further comprising a resolution requester configured to automatically request DNS resolution of the identified domain name with the global DNS resolver based on the resolver information.

15. The system of claim 11, wherein the resolver information module is further configured to determine whether the global DNS resolver is trusted.

16. The system of claim 11, wherein the resolver information module is further configured to receive a selection of a global DNS resolver.

17. The system of claim 11, further comprising a resolution requester configured to request DNS resolution of the identified domain name with two or more DNS resolvers, wherein the resolver information module is further configured to select a resolution that is provided first and wherein the two or more DNS resolvers includes at least one global DNS resolver.

18. The system of claim 11, further comprising a resolution requester configured to request DNS resolution of the identified domain name based on header information.

19. The system of claim 11, wherein the resolver information module is further configured to annotate a uniform resource locator (URL) with the resolver information.

20. A system for domain name system (DNS) resolution comprising:
a domain identification module configured to identify a domain name to be resolved; and
a resolver information module, implemented on a first computing device, configured to:
receive an HTTP header with annotated resolver information from a second computing device, wherein the resolver information is associated with the identified domain name, and wherein the resolver information indicates that a global DNS resolver is to be used by the first computing device to resolve the identified domain name.

21. A computing device-implemented method for domain name system (DNS) resolution comprising:
identifying a domain name to be resolved; and
determining from DNS resolution records, with a first computing device, that a global DNS resolver is to be used by a second computing device to resolve the identified domain name without using a local DNS resolver and without checking, by the second computing device, whether the domain name is resolvable by the local DNS resolver.

* * * * *

UNITED STATES PATENT AND TRADEMARK OFFICE
CERTIFICATE OF CORRECTION

| | | |
|---|---|---|
| PATENT NO. | : 8,533,361 B1 | Page 1 of 1 |
| APPLICATION NO. | : 12/883376 | |
| DATED | : September 10, 2013 | |
| INVENTOR(S) | : James Roskind | |

It is certified that error appears in the above-identified patent and that said Letters Patent is hereby corrected as shown below:

In the Specifications

Column 6
Line 50, please replace "first computing, device," with --first computing device,--.

Column 6
Line 61, please replace "farther," with --further--.

In the Claims

Column 7
Line 37, please replace "without checking, the first computing device" with --without checking, by the first computing device--.

Signed and Sealed this
Fourth Day of February, 2014

Michelle K. Lee
*Deputy Director of the United States Patent and Trademark Office*